US009928738B2

(12) United States Patent
Bauer et al.

(10) Patent No.: US 9,928,738 B2
(45) Date of Patent: Mar. 27, 2018

(54) RED LIGHT WARNING SYSTEM BASED ON PREDICTIVE TRAFFIC SIGNAL STATE DATA

(71) Applicant: Traffic Technology Services, Inc., Beaverton, OR (US)

(72) Inventors: Thomas Bauer, Beaverton, OR (US); Jingtao Ma, Portland, OR (US); Kyle Zachary Hatcher, Portland, OR (US); Paul-Gerard Joseph Albert Pellekoorne, Munich (DE); Frank Offermann, Munich (DE)

(73) Assignee: Traffic Technology Services, Inc., Beaverton, OR (US)

( * ) Notice: Subject to any disclaimer, the term of this patent is extended or adjusted under 35 U.S.C. 154(b) by 162 days.

(21) Appl. No.: 15/185,531

(22) Filed: Jun. 17, 2016

(65) Prior Publication Data

US 2016/0293006 A1 Oct. 6, 2016

Related U.S. Application Data

(63) Continuation-in-part of application No. 14/252,491, filed on Apr. 14, 2014, now Pat. No. 9,396,657.
(Continued)

(51) Int. Cl.
*G05D 1/00* (2006.01)
*G05D 3/00* (2006.01)
(Continued)

(52) U.S. Cl.
CPC ........... *G08G 1/095* (2013.01); *G08G 1/0116* (2013.01); *G08G 1/0129* (2013.01);
(Continued)

(58) Field of Classification Search
CPC .. G08G 1/0116; G08G 1/0129; G08G 1/0141; G08G 1/095; G08G 1/096;
(Continued)

(56) References Cited

U.S. PATENT DOCUMENTS 5,940,010 A 8/1999 Sasaki et al.
6,519,599 B1 2/2003 Chickering
(Continued)

FOREIGN PATENT DOCUMENTS

EP 1615190 A2 1/2006
EP 2824647 A1 1/2015
(Continued)

OTHER PUBLICATIONS

Maile M. et al., Cooperative Intersection Collision Avoidance System or Violations (CICAS-V) for Avoidance of Ciolation-Based Intersection Crashes, Mercedes-Benz Research and Development North America, Inc. USA, Paper No. 09-0118, 2009, fourteen pages [online] [retrieved Jun. 5, 2012] retrieved from the internet URL http://nrd.nhtsa.dot.gov/pdf/esv/es21/09-0118.pdf.
(Continued)

*Primary Examiner* — Rachid Bendidi
(74) *Attorney, Agent, or Firm* — Fisherbroyles LLP; Micah D. Stolowitz

(57) ABSTRACT

Methods and systems are disclosed for generating a timely and reliable warning message before a traffic control signal changes to a red light state. A preferred process leverages traffic signal state data, state change predictions, and signal timing plans. The warning message may be distributed for various uses by downstream users and applications.

14 Claims, 13 Drawing Sheets

Related U.S. Application Data

(60) Provisional application No. 61/811,655, filed on Apr. 12, 2013.

(51) Int. Cl.

| | |
|---|---|
| ***G06F 7/00*** | (2006.01) |
| ***G06F 17/00*** | (2006.01) |
| ***G08G 1/095*** | (2006.01) |
| ***G08G 1/0967*** | (2006.01) |
| ***G08G 1/01*** | (2006.01) |
| ***G08G 1/096*** | (2006.01) |
| ***G08G 1/0962*** | (2006.01) |

(52) U.S. Cl.

CPC ........... *G08G 1/0141* (2013.01); *G08G 1/096* (2013.01); *G08G 1/0962* (2013.01); *G08G 1/096716* (2013.01); *G08G 1/096725* (2013.01); *G08G 1/096758* (2013.01); *G08G 1/096775* (2013.01)

(58) Field of Classification Search

CPC ........... G08G 1/0962; G08G 1/096716; G08G 1/096725; G08G 1/096758; G08G 1/096775

See application file for complete search history.

(56) References Cited

U.S. PATENT DOCUMENTS

| | | | | |
|---|---|---|---|---|
| 6,989,766 | B2 | 1/2006 | Mese | |
| 8,761,991 | B1 | 6/2014 | Ferguson | |
| 9,043,138 | B2 | 5/2015 | Ginsberg | |
| 9,396,657 | B1 | 7/2016 | Bauer | |
| 2003/0128135 | A1 | 7/2003 | Poltorak | |
| 2004/0189489 | A1 | 9/2004 | Terui | |
| 2005/0156757 | A1 | 7/2005 | Gamer | |
| 2005/0187701 | A1 | 8/2005 | Baney | |
| 2006/0009188 | A1 | 1/2006 | Kubota | |
| 2007/0027583 | A1 | 2/2007 | Tamir | |
| 2007/0222638 | A1 | 9/2007 | Chen et al. | |
| 2008/0253615 | A1* | 10/2008 | Kubota | G08G 1/096725 382/104 |
| 2009/0070031 | A1 | 3/2009 | Ginsberg | |
| 2011/0037618 | A1 | 2/2011 | Ginsberg | |
| 2011/0037619 | A1 | 2/2011 | Ginsberg | |
| 2011/0040621 | A1 | 2/2011 | Ginsberg | |
| 2011/0093178 | A1 | 4/2011 | Yamada | |
| 2011/0115646 | A1* | 5/2011 | Matsumura | G08G 1/096716 340/907 |
| 2012/0026014 | A1 | 2/2012 | Miller | |
| 2012/0139754 | A1 | 6/2012 | Ginsberg | |
| 2012/0139755 | A1 | 6/2012 | Ginsberg | |
| 2012/0179358 | A1 | 7/2012 | Chang | |
| 2012/0274481 | A1 | 11/2012 | Ginsberg | |
| 2012/0288138 | A1* | 11/2012 | Zeng | G08G 1/09623 382/103 |
| 2013/0076538 | A1 | 3/2013 | Uno | |
| 2013/0131980 | A1 | 5/2013 | Ginsberg | |
| 2013/0166109 | A1* | 6/2013 | Ginsberg | G08G 1/0967 701/2 |
| 2013/0253754 | A1 | 9/2013 | Ferguson | |
| 2013/0297124 | A1 | 11/2013 | Be | |
| 2014/0032089 | A1 | 1/2014 | Aoude | |
| 2014/0046509 | A1 | 2/2014 | Otake | |
| 2014/0277986 | A1* | 9/2014 | Mahler | G06F 7/00 701/93 |
| 2015/0015421 | A1* | 1/2015 | Krijger | G08G 1/0129 340/932 |
| 2015/0046055 | A1 | 2/2015 | Yamada | |
| 2016/0156881 | A1 | 6/2016 | Guan | |
| 2016/0203717 | A1 | 7/2016 | Ginsberg et al. | |
| 2016/0284215 | A1 | 9/2016 | Ova | |
| 2016/0339959 | A1 | 11/2016 | Lee | |

FOREIGN PATENT DOCUMENTS

| | | |
|---|---|---|
| WO | 2011019445 | 2/2011 |
| WO | 2011163006 | 12/2011 |
| WO | 2013109472 | 7/2013 |
| WO | 2017003793 | 1/2017 |

OTHER PUBLICATIONS

Aoude G. et al.; Behavior Classification Algorithms at Inersections and Validation using Naturalistic Data; Jul. 2011; six pages [online] [retrieved Jun. 5, 2012] URL http://acl.mit.edu/papers/IV11AoudeDesarajuLaurensHow.pdf.

Gminsidenews.com; DCS Preps Safety System to Previent Red-Light Running; Jun. 18, 2006, eleven pages [-online] [retrieved Jan. 23, 2012] retrieved from the internet http://www.gminsidenews.com/forums/f58/dcx-preps-safety-system-prevent-red-light-running-32921.

Faezipour, M et al.; Progress and Challenges in Intelligent Vehicle Area Networks; Communication of the ACM, Feb. 2012; pp. 90-100, vol. 55, No. 2.

Strauss S., Traffic Magic, University Affairs, Dec. 7, 2009, [online] [retrieved Aug. 17, 2010] retrieved from the internet URL http://www.universityaffairs.ca/Print.aspx?id=7102.

Vaughan Inman and Gregory Davis; The Effects of In-Vehicle and Infrastructure-Based Collision Warnings at Signalized Intersections; US Department of Transportation, Federal Highway Administration; Publication No. FHWA-HRT-09-049; Dec. 2009 (46 pages).

European Patent Office; International Search Report and Written Opinion of the EPO (ISA) PCT/US2016/038817; dated Oct. 19, 2016; 14 Pages.

PCT, International Search Report and Written Opinion of the lcnternational Searching Authority, PCT/US2016/038817, dated Oct. 19, 2016, 14 pages.

* cited by examiner

Prediction System

Signal change sequences
Variable intervals
Fixed interval control events

- What predicted changes are certain
- 
- What changes begin a fixed-time interval event;
- 
- What predicted changes lead to a sequence that ends with a red light

RED LIGHT WARNING SYSTEM BASED ON PREDICTIVE TRAFFIC SIGNAL STATE DATA

RELATED APPLICATIONS

This application is a continuation-in-part of U.S. patent application Ser. No. 14/252,491, filed Apr. 14, 2014, which is a non-provisional of U.S. provisional application No. 61/811,655 filed on Apr. 12, 2013, both incorporated herein by this reference.

COPYRIGHT NOTICE

©2013-2016 Traffic Technology Services, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure pertains to electric traffic control signals of the sort commonly found at street intersections, freeway ramps, and the like, for directing traffic, which may include without limitation pedestrians, bicycles, cars, buses, mass transit vehicles, etc.

BACKGROUND

It has been suggested that predicting traffic signal changes would be useful. For example, Ginsberg refers to predicting a likely remaining duration of the traffic signal in a particular state; see U.S. Pat. App. Pub. No. 2013/0166109. The need remains, however, for practical and effective solutions for red light running warning message generation from predictive traffic signal state data and communication of such messages in near real-time to vehicle systems and or operators.

The Connected Vehicle Reference Implementation Architecture (CVRIA, http://www.iteris.com/cvria/html/applications/app57.html), takes the signal phase and timing (SPaT) data and begins broadcasting to vehicles approaching or near the intersection. The red light running warning applications focus on field communications between different entities within the local intersection context. They assume the SPaT will cover the red light message that has already been generated.

Other prior art such as US 2005/0156757, only implied that they will focus on the known state or sequence of state to prepare the red light running warning. For example, it implied that the yellow signal will lead to the red signal and thus at yellow light the warning can be already generated for concerned vehicles. [Paragraph 0019]. The need remains for effective red light running warning message generation from predictive traffic signal state data and communication of such messages in near real-time to vehicle systems and or operators. Vehicle systems may include autonomous or semi-autonomous control systems.

DETAILED DESCRIPTION

Glossary

Figure 1:
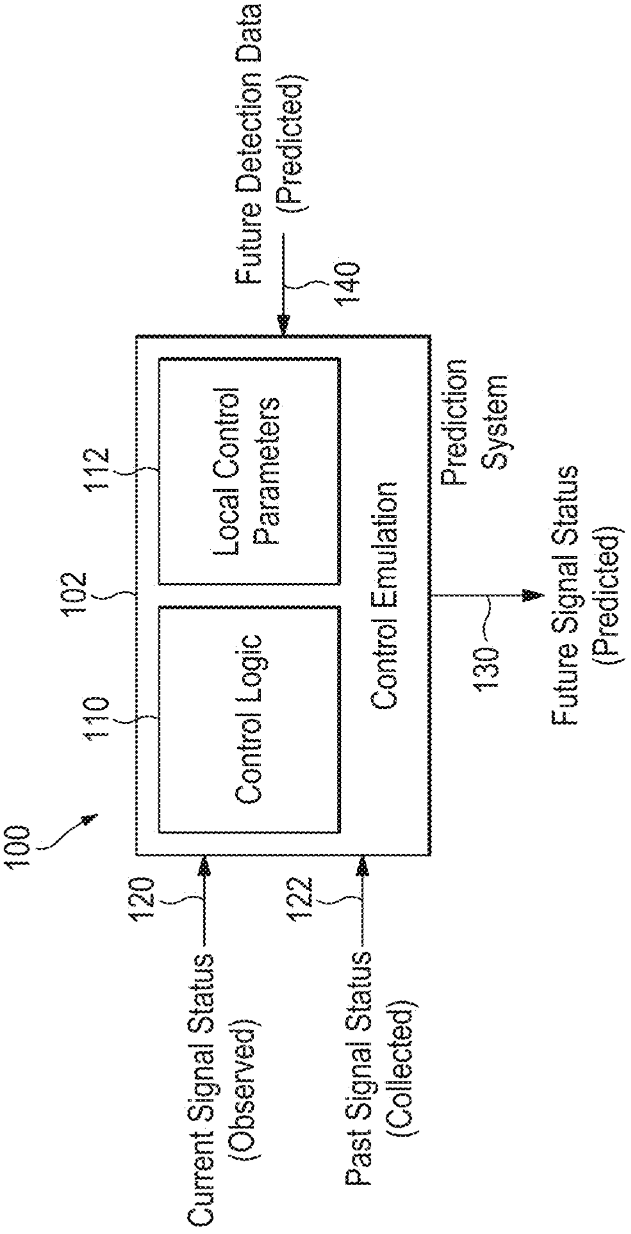
FIG. 1 is a simplified conceptual diagram of a traffic control prediction system.

Some of the terms used herein may be defined as follows.

Traffic Signal or simply "Signal". Refers to a set of traffic control devices generally deployed at a single street intersection, highway ramp or other field location. A traffic signal is controlled by an associated Field Signal Controller ("FSC").

Field Signal Controller ("FSC"). Refers to a controller, generally comprising electronics and/or software, arranged to control a Traffic Signal. The Field Signal Controller may be located at or near the corresponding Traffic Signal location, such as a street intersection, or at a central traffic management center, or some combination of the two. An FSC may operate according to various rules, algorithms, and inputs, depending on the location and circumstances of the signal it controls. For example, raw inputs may be provided to the FSC by a Detector.

Field Signal Controller State. Refers to the state of an FSC, for example, the status of one or more internal timers, and the state or status of one more Indicators controlled by the FSC. The FSC has a given state at a specific time.

Cycle Time. An FSC may change state according to a Cycle Time, although the cycle time may not always be constant. For example, a weekday cycle time may differ from a weekend cycle time for a given FSC.

Detector. Refers to an electrical, magnetic, optical, video or any other sensor arranged to provide raw input signals to an FSC in response to detection of an entity such as a motor vehicle, transit vehicle, bicycle or pedestrian. The input signal may correspond to the arrival, presence, or departure of the vehicle. A detector also may be activated manually, for example, by a pedestrian or a driver pressing a button. Of course, a detector also may be initiated remotely or wirelessly, similar to a garage or gate opener. In general, Detectors provide raw inputs or stimuli to an FSC.

Controller Emulator. Is discussed in more detail below, but in general may comprise computer hardware or other electronics, and/or software, wherever located, that is arranged to mimic or emulate the operation of an FSC.

Indicator. Refers to one or more signal lights or other visible and/or audible indicators arranged to direct or inform a user such as a motor vehicle driver, bicyclist, pedestrian, or transit vehicle operator at or near a given traffic signal location. A common Indicator for motor vehicles is the ubiquitous Green-Yellow-Red arrangement of lights. Typically an Indicator is triggered or otherwise controlled by the FSC associated with the signal location.

Prediction. Discussed in more detail below; in general, a Controller Emulator may be implemented as part of a system to predict the future behavior of a Field Signal Controller, and more specifically, to predict the specific types and timing of a field signal controller future state change.

Phase. In a signal timing plan, for example, a Phase is "A controller timing unit associated with the control of one or more movements. The MUTCD defines a phase as the right-of-way, yellow change, and red clearance intervals in a cycle that are assigned to an independent traffic movement." So it refers to one or multiple movements that are allowed to go together under the signal control, for example, a northbound left turn can have its own (protected) phase. Or the northbound left turn can also be coupled with the northbound through (and right turn in that matter) and thus the entire northbound movements become one phase (in this case northbound left turn vehicles may have to find gaps between opposing southbound through traffic to cross the street).

Some traffic signals operate on a fixed schedule, while some others are "actuated" or may be adaptive to various conditions. Embodiments of the present invention may be used with all types of non-fixed time signals. Connecting vehicles to the traffic signal infrastructure is a new concept that promises to reduce fuel consumption and save time. We described herein various methods and apparatus to accomplish this functionality. The embodiments described below are not intended to limit the broader inventive concept, but merely to illustrate it with some practical implementations. The ongoing improvements in related technologies, such as cloud computing, wireless data communications, vehicle head units, video, etc. will enable further embodiments in the future that may not be apparent today, but nonetheless will be equivalent variations on our disclosure, perhaps leveraging newer technologies to improve speed, lower cost, etc. without departing from our essential inventive concept.

Some communication infrastructure is necessary to deliver various "signal data" (for example, states, timers or predictions) into a (potentially moving) vehicle in real-time. Preferably, the vehicle (or its operator) not only is informed about the current status of the signal, but also what the signal is going to do in the near-term future. Predictions of traffic control signal status and or changes can be utilized to advantage by a vehicle control system, either autonomously or with driver participation. Predictions of traffic control signal status and or changes can be utilized by a vehicle operator independently of a vehicle control system. One important aspect of the following discussion is to describe how to create traffic signal predictions and deliver them to a vehicle/driver in a timely and useful manner.

Predictions of traffic control signal status and or changes may be delivered to a vehicle in various ways, for example, using the wireless telecom network, Wi-Fi, Bluetooth or any other wireless system for data transfer. Any of the above communication means can be used for communication to a vehicle, for example, to a "head unit" or other in-vehicle system, or to a user's portable wireless device, such as a tablet computer, handheld, smart phone or the like. A user's portable device may or may not be communicatively coupled to the vehicle. for example, it is known to couple a mobile phone to a vehicle head unit for various reasons, utilizing wired or wireless connections.

Predictions of traffic control signal status and or changes may be displayed for a user on a vehicle dashboard, head unit display screen, auxiliary display unit, or the display screen of the user's portable wireless device, such as a tablet computer, handheld, smart phone or the like. As an example, a prediction that a yellow light is going to turn red in two seconds may be provided to a driver and/or to a vehicle that is approaching the subject intersection. One aspect of this disclosure is directed to the use of control emulation to generate this type of short-term prediction.

Figure 5:
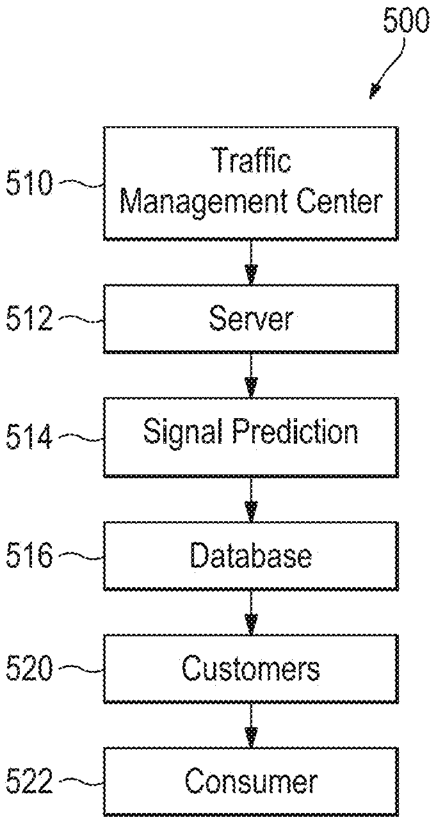
FIG. 5 is a simplified high-level diagram showing information flow in some embodiments and applications of the present disclosure.

FIG. 5 is a simplified introductory diagram showing information flow 500 in some embodiments and applications of the present disclosure. Here, a traffic management center 510 may be deployed, for example, in a city, to provide centralized traffic management functions. In some cases, the traffic management center may communicate data or instructions electronically to individual signal controllers. Conversely, the traffic management center may be arranged to receive information from signal controllers around the city. The individual controllers may provide state data, which may include vehicle call data responsive to detector inputs signals. A server 512 may be configured to store and analyze data received at or provided by the TMC. The server 512 may be arranged to receive and store longer term controller data (defined later), such as vehicle call data, and to generate statistical analyses of such data, as further explained below.

Again referring to FIG. 5, the server may provide data as further described below to be used in a signal prediction feature 514. The signal prediction process in turn generates signal prediction data into a database 516. That database 516 may be made accessible to selected customers 520. For example, such customers may include automobile manufacturers, after-market automotive suppliers, etc. The prediction data in the database may then be communicated electronically to motor vehicles or their operators, also referred to as consumers 522.

Figure 6:
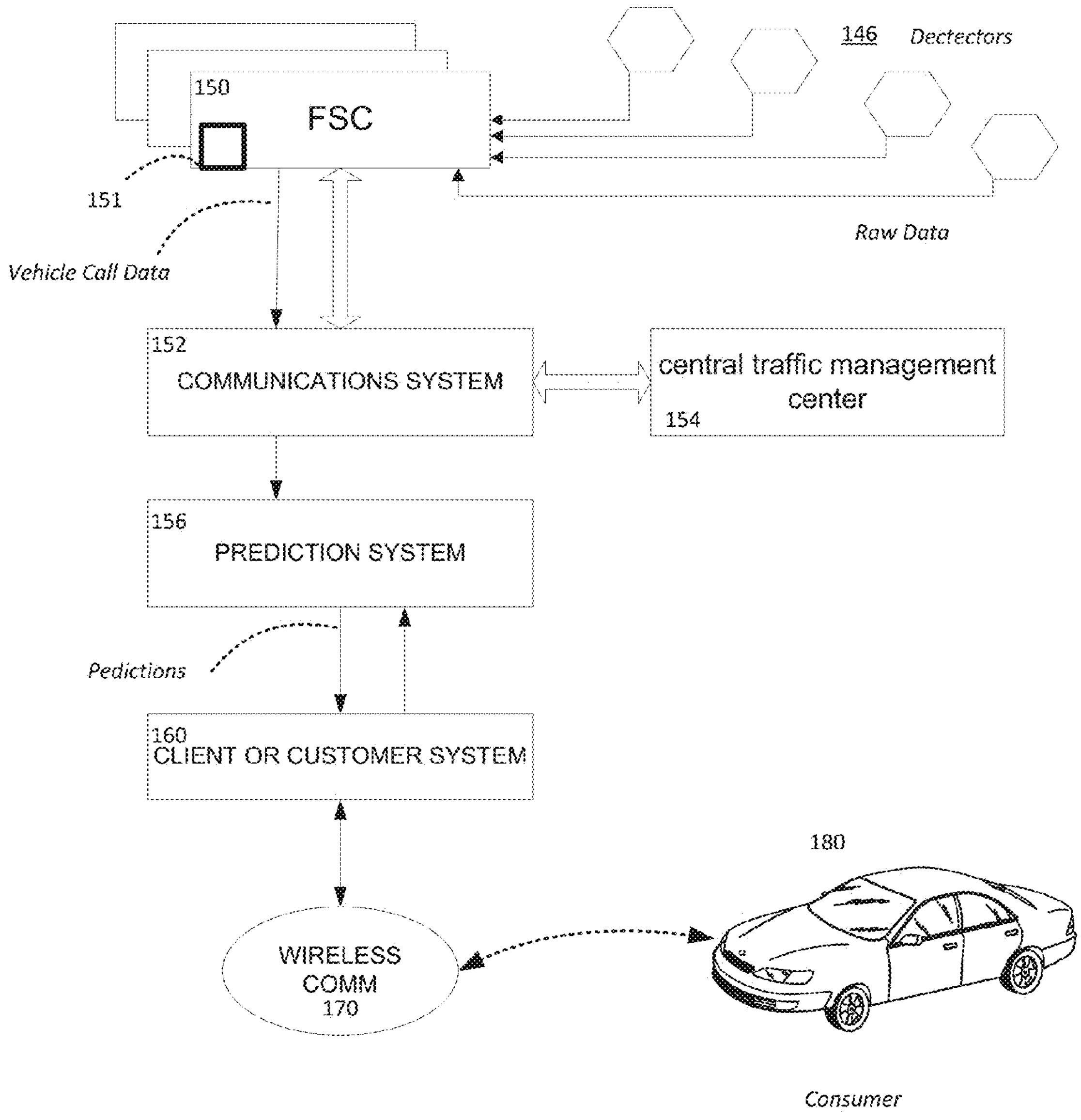
FIG. 6 is a simplified communications diagram of a traffic control prediction system.

FIG. 6 shows an alternative system in more detail. One or more detectors, referenced generally at 146, provide raw data or input signals to an FSC 150. Details of these connections are known. The FSC 150 is often coupled to a communication system 152 operated by local traffic management authorities. The authorities may operate a central traffic management center 154, although some FSC's may operate autonomously. In some embodiments, a prediction system as disclosed herein may obtain data from the central management center, as indicated in FIG. 5. In other embodiments, the prediction system may obtain data solely from the FSC. The FSC 150 receives raw data from the detectors 146 and processes that raw data to generate vehicle call data or "calls." A call may result from, for example, the detected arrival of a car 50 feet behind an intersection limit line, in a particular lane. However, we will use the terms "vehicle call" or "vehicle call data" herein in a broad, generic sense in that any given call may be responsive to any type of vehicle, pedestrian, bicycle or other input stimulus.

The vehicle call data is provided to the prediction system 156. It may be communicated via the communication system 152. Preferably, the same vehicle call data generated by the FSC is provided both to the prediction system 156 and to the central management center 154. In some embodiments, the FSC may have a wireless modem 151 installed to communicate call data wirelessly. It may receive detector data wirelessly as well. The prediction system 156, responsive to received vehicle call data and other parameters, generates predictions of FSC state changes, which may include indicator state changes. The predictions may be communicated to a client or customer 160. For example, the client may be an automobile manufacturer, or an aftermarket product or service vendor. The predictions may be conveyed to the client 160 using a push protocol, a pull protocol, regularly scheduled updates or other variations which, in general, should be arranged to be reasonably timely. In a presently preferred embodiment, a push message is executed once per second. In some embodiments, the client 160 may communicate predictions, or information based on the predictions, via a wireless communication system or network 170, to its customers or consumers 180, typically in a motor vehicle. The prediction system 156 in some embodiments may correspond to the prediction system 100 explained in more detail with regard to FIG. 1.

FIG. 1 is a simplified conceptual diagram of an example of a traffic control prediction system 100. The system comprises a control emulation component or system 102, which may include control logic 110 and local control parameters 112. The local control parameters match those of the actual FSC of interest. The local control parameters may include, for example, timing parameters, cycle time, etc.

In this illustration, the prediction system 100 receives current signal status (observed) as input data 120. The current signal status (real time) may be communicated from the FSC using known protocols. The signal status preferably includes state information and current vehicle call data. The prediction system also receives past signal status (collected) as input data 122. Past signal status data may be collected and processed off-line. For example, such data may be accumulated over several days or weeks. This data may be stored in a database for statistical analysis as further described below.

The prediction system 100 also receives future vehicle call data (Predicted) as input data 140. The future (predicted) detection data 140 is used to advance the control emulator, while applying the local control parameters, to a new state that reflects what the actual controller state is likely to become in the near future. As discussed below, the emulator can be clocked at a rate faster than real-world time, so that it "gets ahead" of the current state of the actual FSC being emulated. The results of the emulation may comprise a future signal status (predicted signal status), indicated as output data 130. The predicted signal status may be communicated to a vehicle or a vehicle operator, or other user, as further described below.

Figure 2A:
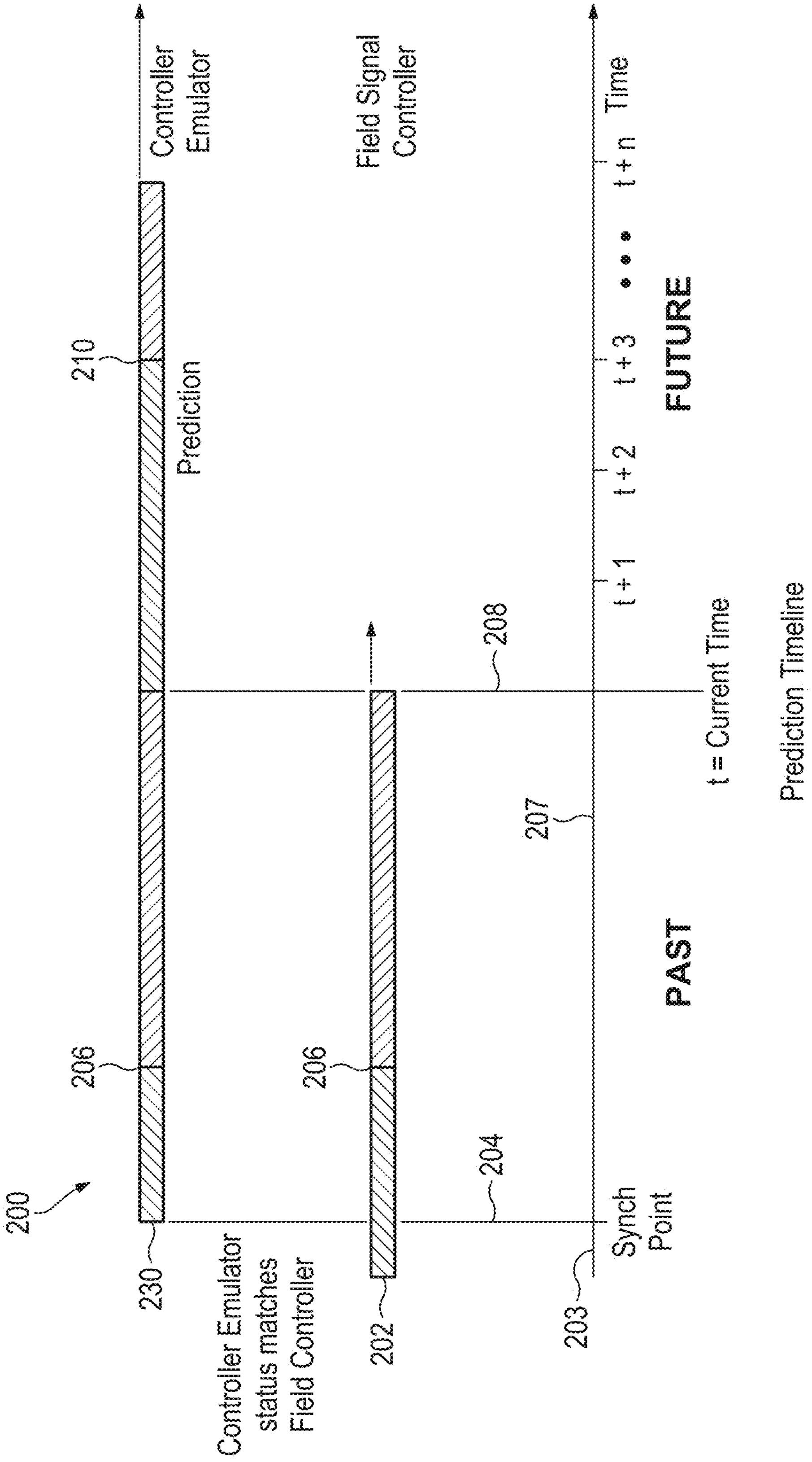
FIG. 2A is a simplified timing diagram illustrating synchronization of a controller emulator process to a field signal controller.

FIG. 2A is a simplified timing diagram illustrating the pertinent timing relationships in greater detail. In the timeline, time is indicated along the bottom axis 200, moving from the past on the left to the future on the right. The actual (real world) current time=t is indicated at vertical line 208. A first bar 202 represents time in the field signal controller, as for example, may be maintained by a local system clock. A second bar 230 represents "time" in the controller emulator (or emulation process).

One challenge presented is to synchronize a state of the controller emulator to the current state of the actual FSC. The difficulty arises because the FSC continues to run, and change state, continuously. It is not practical, and potentially even dangerous, to stop the FSC in order and capture a current state. In order to synchronize state to this "moving target," a process may proceed as follows. First, actual FSC data is collected during a period 203 that is before the point in time marked "Sync Point" 204. An emulator process is initialized to that "old" FSC status to begin. Then, at the sync point in time 204, at least one emulator process is started, and it runs forward from the sync point, up to the current time t and beyond. The emulator "catches up" to the current real-world time t by clocking it at a faster rate. During this time period 207, the emulator process receives call data provided by the FSC responsive to detector inputs or the like. Consequently, the emulator will clock through the same state changes as the actual FSC during this period, up to the current time (t) at 208. Thus the emulator is now fully synchronized to the FSC, at the actual current time.

Starting from the current time t, it remains to predict what the FSC will do in the future. The units are not critical, but intervals of one second are convenient in a presently preferred embodiment. In order to drive the emulator to an expected future state, say a time t+1 or t+3 in FIG. 2, the emulator receives "future detection data" indicated as 140 in FIG. 1. The future detection data may be generated, for example, by a statistical or probability analysis of actual detection data received at the subject FSC in the past. Again, the controller emulator is running in "fast forward" mode.

To simplify, here we discuss only a single detector for illustration. For example, one detector might be an in-ground induction loop that detects the presence of a car. Or, it might be a pedestrian push-button. The raw input signals from the detector are received by the FSC and converted into vehicle call data as noted. That call data may be collected and stored over a data collection period, say two weeks, and analyzed using known statistical analyses. The goal is to analyze past behavior of the FSC to help predict its likely future behavior. The data collection period may vary depending on circumstances, and may be changed to optimize it for a given application. The analysis may show, for example, that there is a 40% likelihood of a given call after 2 seconds; and a 60% likelihood of receiving that call after 3 seconds; and perhaps a 90% likelihood or receiving that call after 4 seconds. Each emulator may be calibrated as to how best use this data. For example, the 60% likelihood may be deemed sufficient to trigger a predicted call at t+3. In another application, it may wait until t+4 when the likelihood is greater. Assuming the predicted (and simulated) call is input to the emulator at time t+3, it will change state accordingly. Assuming no other inputs for simplicity of illustration, the emulator now reflects a state that the real FSC is likely to reflect in the future, namely at time t+3.

Thus a prediction at 210 is completed. The prediction is captured and the emulator instance may be terminated.

Figure 2B:
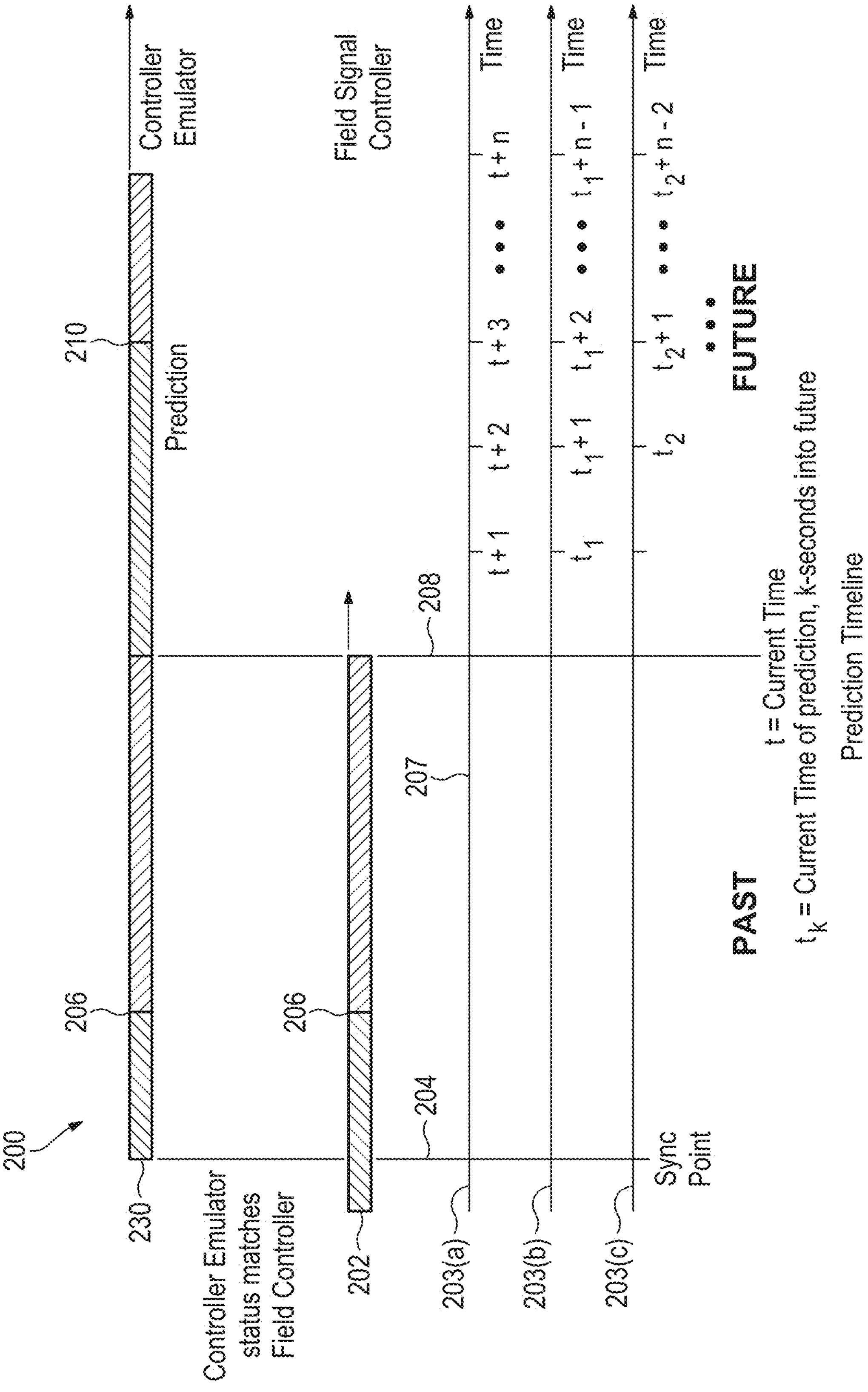
FIG. 2B is an augmented version of FIG. 2A illustrating a series of staged future predictions.

FIG. 2B is an augmented version of FIG. 2A illustrating a series of staged future predictions. In this embodiment, after completing a prediction, the results are stored in a buffer or queue to be available for communication to the client. Obtaining the live statuses from an FSC takes time, as does running the emulator. In order to deliver predictions with minimal lag attributed to such tasks, multiple predictions can be made in each emulation step. For example, assume a prediction is made that an indicator light will change from red to green 3 seconds into the future, as indicated at mark 210. In the same emulation step, we would find that barring unforeseen changes to the live system, 1 second into the future, the emulator would predict a change to occur in 2 s. In 2 seconds into the future, the emulator would predict a change in 1 s. Delivering all three of these predictions to the buffer or queue will result in multiple predictions with respect to the same time, t, even before we reach that time, t, by the emulator. Thus, if there is lag when obtaining the signal statuses and/or performing the emulation, it can be absorbed by the most recent prediction along one of the future tracks (203(*b*), 203(*c*), etc) which pertains to the same base time, t. These results may be more reliable than alternatives, such as automatic time corrections, because the corrections can be derived using the same emulator as the predictions themselves.

Figure 3:
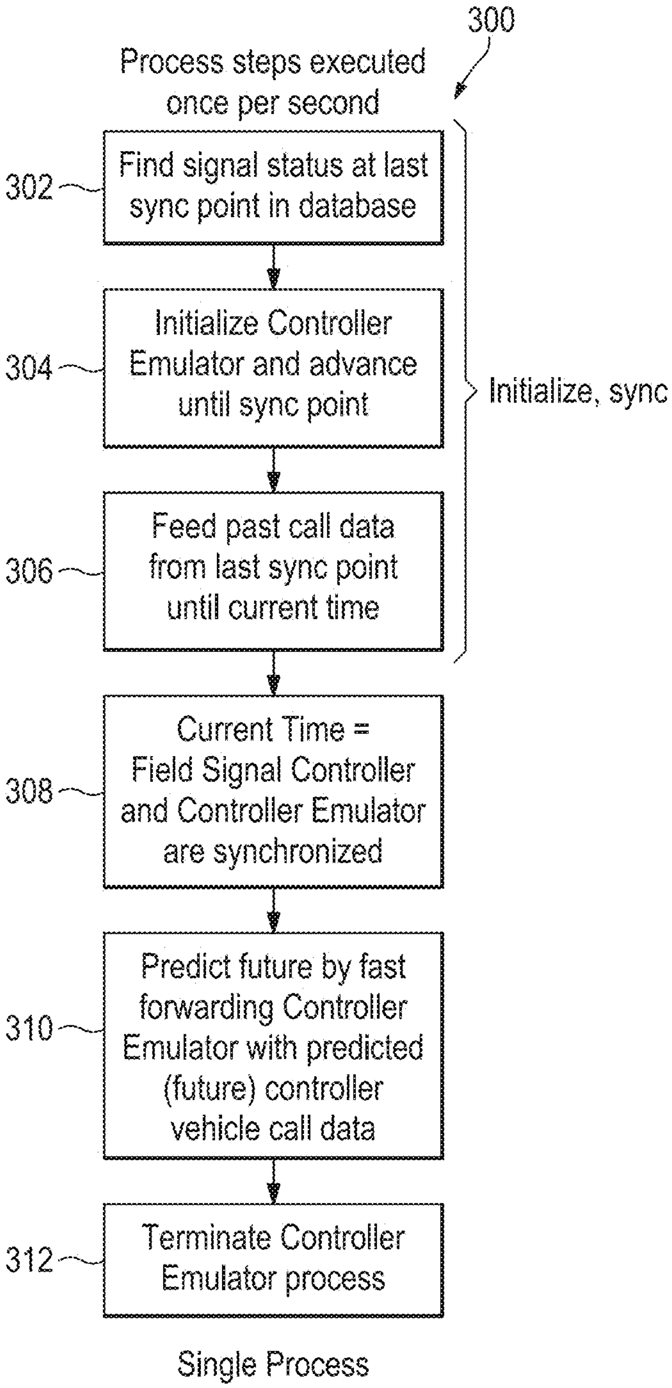
FIG. 3 is a simplified flow diagram illustrating a process for short-term signal status prediction based on a control emulation process.

FIG. 3 is a simplified flow diagram illustrating one emulation method 300 of the type described above, utilizing a single emulator process. Here, we use the term "process" to refer to a computer software process, thread, or the like. In a preferred embodiment, the following process steps may be executed once per second. At block 302, the method calls for finding signal status at a last sync point in a database. At block 304, a controller emulator is initialized and advanced to that last sync point. And at block 306, the method calls for feeding past call data into the emulation, from the last sync point, until the current time t. As noted with regard to FIG. 2, at this time t the emulator is synchronized to the subject FSC, as noted in block 308.

At block 310, the likely future FSC behavior is predicted by fast forwarding the controller emulator, using predicted (future) detection data. The predicted state change may be saved and/or exported, as noted above. At block 312, we terminate the controller emulator process. In some embodiments, the same emulator process may then be re-initialized and run again, in the same fashion as above. Or a new instance may be spawned. On the next operation, and each subsequent run, the process is re-initialized to a more recent sync point.

Figure 7:
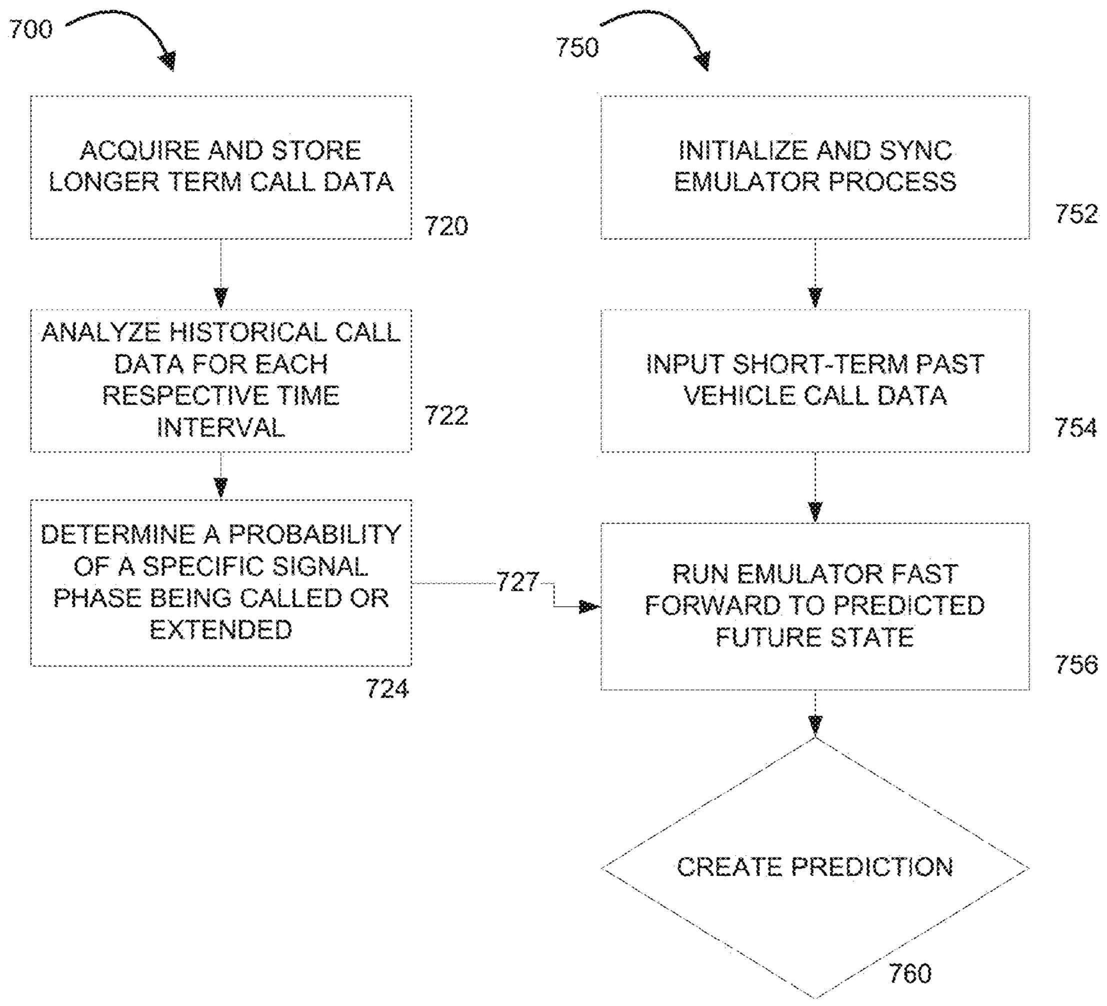
FIG. 7 is a simplified flow diagram illustrating a process for traffic signal predictions utilizing a combination of statistical analysis of historical signal call data, combined with emulation process results.

FIG. 7 is another simplified flow diagram illustrating a process for traffic signal predictions utilizing a combination of statistical analysis of historical signal call data, combined with emulation process results. On the left side of diagram indicated at 700, block 720, we acquire and store longer term signal call data. "Longer term" here refers to multiple days, typically, or even several weeks. These magnitudes of time, and preferably two weeks, have been found suitable for some applications. Next, block 722, the historical data is analyzed for selected time intervals. The time intervals may be for example, 15 minutes, or an hour or two, or a day, or a number of cycle times. The statistical analyses may also includes variables for time of day, calendar date, time of year, holidays, etc. The process may determine, at block 724, a probability of a specific signal phase being called or extended. In some embodiments, historical analysis may be done offline, or in a process or processor separate from the controller emulator process.

An emulator process may be initialized and synchronized, block 752. For example, an emulator process may be synchronized to a sync point as discussed. Next, current vehicle call data may be input to the emulator process, block 754. For example, "short-term past" may correspond to the time period 207 in FIG. 2A, between a sync point and the current time t. The emulator is run "fast forward" block 756 and during that time it receives and processes both the actual call data 754 and the predicted call data via path 727 from process block 724. The emulator creates 760 a prediction of what state change will occur in a corresponding field signal controller, and when.

In some embodiments, a method may include repeating the foregoing steps at a rate of once per second, so as to enable updating the predicted signal status once per second. In some embodiments, field detection data may be received as signal phase data for input to the emulator. In some embodiments, the current state of the emulator includes indicator phase displays (e.g., red, yellow, green, walk, flashing don't walk), and active timers (e.g., minimum green, yellow clearance, red clearance, pedestrian walk, pedestrian clearance, etc.)

The predicted signal status may be forwarded or communicated to a vehicle/driver who may be approaching the subject traffic signal. In an embodiment, a motor vehicle may be equipped with suitable equipment to receive that prediction data, and convey it to a control system and/or a passenger or driver of the vehicle. In one embodiment, prediction data may be displayed on the dashboard; in another embodiment it may be displayed on a head unit or navigation unit display screen. The "navigation unit" may be standalone, or implemented as an "app" on a mobile device.

Figure 9:
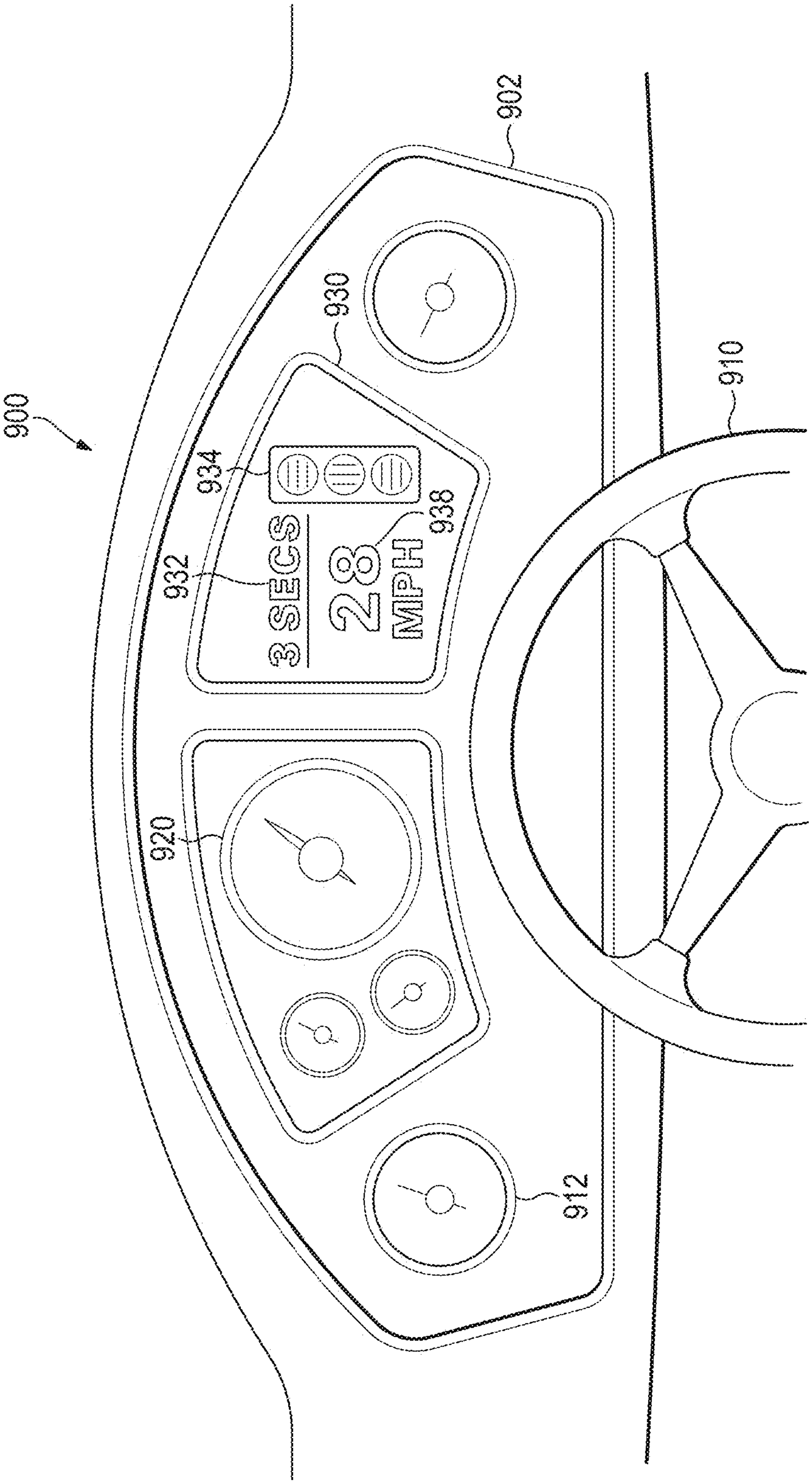
FIG. 9 shows an example of a traffic signal prediction display in a vehicle dashboard.

FIG. 9 shows an example of a traffic signal prediction display (930) in a vehicle dashboard. In FIG. 9, a vehicle dashboard is indicated generally at 900. Dashboard 900 may include an instrument panel 902, comprising various gauges or instruments 912, and typically a speedometer 920. A steering wheel 910 is shown (in part) for context. A traffic signal prediction display 930 in this example may comprise a time display 932 ("3 SECS") and a signal display 934. For example, the signal display 934 may comprise three light indicators. They may be red, yellow and green, and they may be arranged like the signal lights in a typical intersection traffic control signal.

It is not critical, however, that the light indicators be arranged in that manner, or that colored lights are used at all. Various visual display arrangements other than this example may be used; and indeed, audible signaling (not shown) may be used as an alternative, or in addition to, a visual display. The essential feature is to convey some traffic signal prediction information to a user. For example, in FIG. 9, the time display 932 may indicate a number of seconds remaining until the traffic signal that the vehicle is approaching is expected to change state, say from yellow to red. In some embodiments, the traffic signal prediction display 930 may include a speed indicator 938 ("28 MPH"). This may be used to indicate a speed calculated for the vehicle to reach the next signal while it is in the green state.

Having knowledge of what an upcoming traffic signal is going to do in the near future can be used to save gas, save time, and reduce driver stress. For example, when the wait at a red light is going to be relatively long, the driver or an on-board control system may turn off the engine to save fuel. And the prediction system will alert the driver in advance of the light changing to green, to enable a timely restart of the engine. Or, a driver or control system may adjust speed to arrive at a green light. Travel time may be saved by routing optimizations that are responsive to anticipated traffic signal delays. Toward that end, the database prediction data may be provided to a mapping application. Stress is reduced as a driver need not continuously stare at a red signal light, waiting for it to change. In fact, if the wait is known to be long, the driver may want to check her email or safely send a message.

Alternative Emulation Embodiments

Instead of using only one emulation process to do the prediction, in another embodiment we use one separate process for each cycle second. That way, we don't have to go back in time to the sync point to resynchronize the emulator before being able to play forward every time step. Instead, in one embodiment, we start up as many emulation processes as there are cycle seconds at the synch point. We keep them all synchronized every time step, and then use one of them to play forward and predict for every time step as we move through the cycle second (after which we discard the process). This approach significantly reduces the computation and real-time data storage burdens as we no longer have to keep track of vehicle call data in real-time between sync point and current time. Instead, we have many more, but less computing-intense processes, which is preferable for a cloud computing environment.

Figure 4:
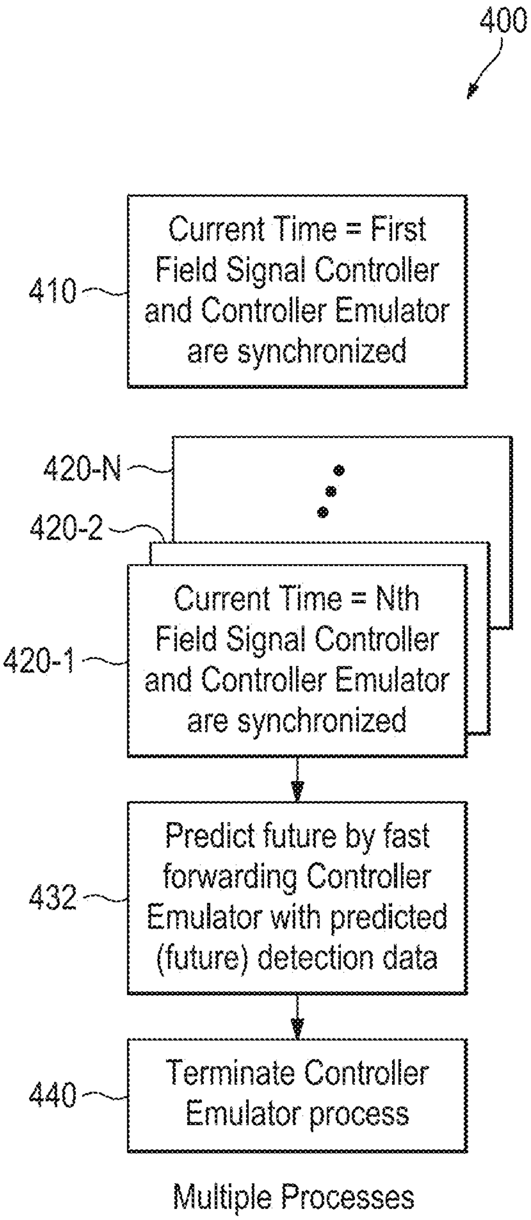
FIG. 4 is a simplified flow diagram of an alternative process for short-term signal status prediction based on using a plurality of control emulation processes.

FIG. 4 is a simplified flow diagram of an alternative process 400 for short-term signal status prediction, utilizing a plurality of control emulation processes. Process steps may be executed periodically, for example, once per second, although this interval is not critical. A first controller emulator (or controller emulator process) 420-1 is synchronized to the field controller, block 410, thereby establishing an initial "Current Time." Similarly, a second controller emulator 420-2 also is synchronized to the field controller, so that the second emulator also is synchronized to the "Current Time." In like manner, additional controller emulator processes may be synchronized to the same Current Time, as indicated by 420-N. After all relevant emulator processes have been initialized and synchronized, all of them commence execution responsive a common clock signal, and thereby remain synchronized.

Subsequently, at block 432, we "fast forward" all of the controller emulator instances to predict future control signal state changes, using predicted (future) call data. Each emulator instance may be terminated at a selected time "in the future." For example, in FIG. 2A, a prediction is concluded at a future time "t+3" indicated at 210. That emulator instance is then terminated, block 440. However, the remaining instances continue to run, as explained with regard to FIG. 8.

Figure 8:
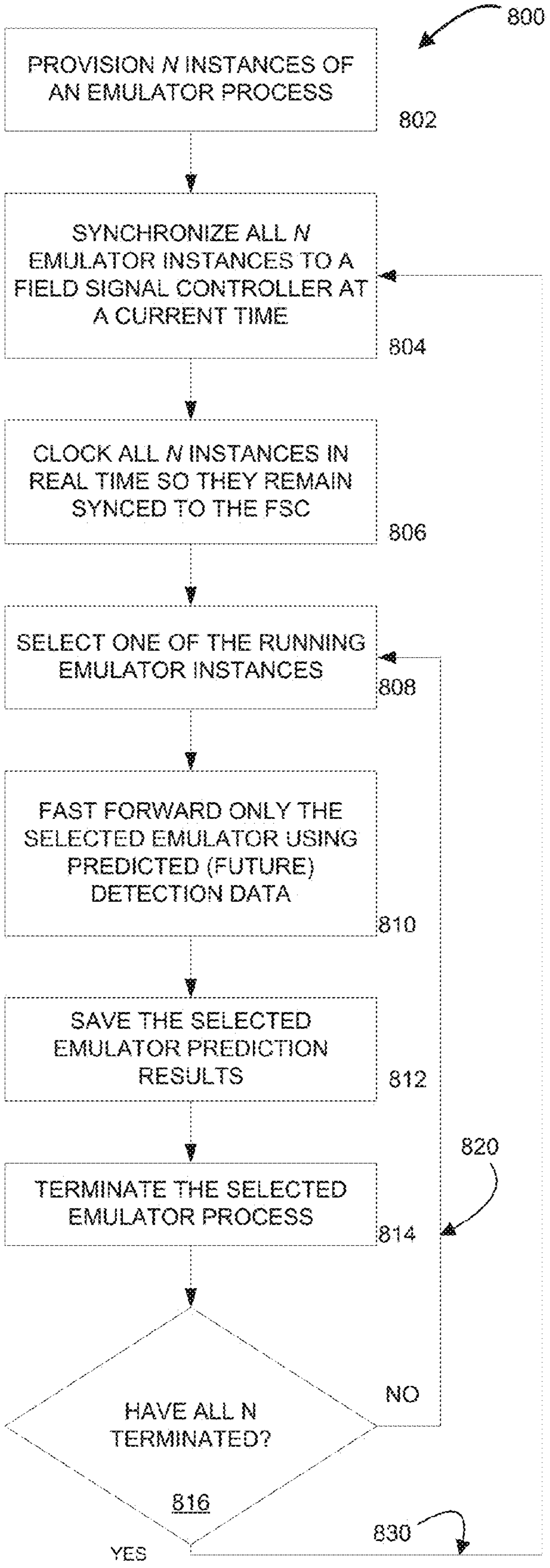
FIG. 8 is a simplified flow diagram of an alternative emulation process that utilizes a plurality of emulator instances, all advancing from a common synchronization state.

FIG. 8 provides a simplified flow diagram 800 of a multiple-emulator embodiment. Preferably each emulator may be an instance of suitable code. At block 802 we provision N instances of an emulator process, where N is an integer on the order of approximately 10-40, although this number is not critical. At block 804, all N instances are synchronized to the same field signal controller at a current time. Methods for doing so are described above. Next, at block 806, we clock all N instances in real time, so that all of them remain actually synchronized to the field signal controller. To remain fully synchronized, the instances also receive real-time detector calls; the same inputs as provided to the FSC.

Next, at block 808, the system selects one of the running emulator instances, and then, block 810, "fast forwards" only the one selected instance, typically by applying a faster clock than the real-time clock. During the fast forward process, predicted future detection data is input to the instance, as discussed above. In one embodiment, the selected instance performs this prediction over a one-second interval.

At the end of that prediction, block 812, the system saves the selected emulator prediction results. For a first selected emulator, this would provide t+1 second prediction results. Then the selected emulator process (only one) is terminated, block 814. Note that meanwhile the other N−1 instances have continued, under real-time clocking, to remain synchronized to the field signal controller, so they are ready to go "fast forward" from their current state. Decision 816 determines whether all N instances have terminated. If not, the process continues via path 820 back to block 808, and selects a second one of the remaining emulators. The second selected emulator instance, only, is then "fast forwarded" as described above with regard to block 810 and the process continues as before using the second selected emulator instance to perform a second prediction. The second prediction may be for time t+2. This same loop 820 is then repeated again for each of the remaining N−2 instances, so that each instance provides a prediction at a time in the future. So, for example, 50 instances might be provisioned to predict signal changes 50 seconds into the future.

Decision 816 detects when all N instances have terminated. The process then loops via path 830 back to block 804 whereupon all N instances are synchronized anew to the new current time t. The process continues to repeat as described so as to continually provide predictions of field controller state. It should be noted that emulation is merely one approach to prediction of signal state changes. Other methods, for example, purely statistical methods, can be used for prediction of traffic control signal operations.

Red Light Warnings

In the description above, we disclosed an emulation mechanism to predict traffic signal state changes. As noted, other prediction methods may be used such as statistics-based predictions. In both cases, there is uncertainty in the predictions; what will happen when is not exactly deterministic. In some embodiments, a prediction system may compute two main signal switches for any phase under control, namely red to green, or green to red. Utilizing statistical support, as explained earlier, the emulation mechanism can assign probabilities to different predictions when the prediction is not certain.

There are many potential uses and advantages to be gained with an accurate prediction or warning ahead of a traffic control signal state change to a red light. One obvious use is to alert a driver of a vehicle that is approaching a signal that it is going to turn red soon. Given an accurate warning, say for example, 10 seconds remain until a change to the red state, the driver can make an informed judgment as to whether to proceed through the intersection or slow to a stop. Autonomous or semi-autonomous vehicles can take the warning message into account in their operational logic to improve safety. Another advantage is savings in fuel (for example, fossil fuels, electrical charge, etc.) by slowing a vehicle ahead of an intersection, given an accurate warning in advance about when it will change to red. Improved fuel efficiency can be gained in human operated as well as automated vehicles.

The stumbling block with known technologies is the technological problem of achieving an accurate warning in advance of a red light change. Specifically, the technological problem involves two dimensions. First, the problem is that predictions are not entirely accurate. Some predictions are based on statistics, and they are imprecise for that reason. Often, for traffic control signals, even though a prediction was "correct" when made, a new input in the traffic control system can cause it to be wrong. For example, in some left-turn lane phases, a number of cars waiting or in the queue to turn left can cause the controller to extend the usual or default left-turn green state duration. And the duration may be variable, in response to a number of cars in the queue, or other factors, up to a predetermined limit or maximum green time. Upon reaching the limit, the signal will change state, typically to yellow, no matter how many cars are waiting to turn left. The point is that the state change to yellow actually is indeterminate.

The other problem is time, i.e. delay or latency. Traffic signal state data, in many applications, must travel from the traffic signal controller at a given intersection to a central traffic management center, and thence to another system where predictions are created. Ergo, the state data input to the prediction equipment is delayed, and the exact amount of this latency is variable, so it is hard to correct for it. This combination of latency and sometimes unreliable predictions make it challenging to programmatically generate a timely and reliable warning in advance of a red light change; and "false positives" should be avoided. That is, a red light warning message should not be sent out if it is wrong or may turn out to be wrong.

Below, we describe additional aspects and features more specific to the red signal phase change. Here, in preferred embodiments, uncertain predictions may be discarded, and only certain predictions that are certain to occur will be relayed, as explained in more detail below. This feature can be utilized to enable an event-based red light warning service that will be initiated only when the system "knows" the relevant signal switch times.

For example, for an actuated phase that is reaching the last vehicle extension before reaching maximum green, the emulation cannot predict exactly when the phase will change from green to yellow, but once yellow, it can predict exactly when, or how long until, it will turn red. That is, typically the yellow signal phase has a fixed, predetermined duration. That yellow time is one of several fixed-interval control events that may be provided in a traffic control timing plan. This prediction can be used to automatically form a red light warning message before the signal device is predicted to change state to a red signal phase. The warning message can be distributed as further described below, before the red signal change actually occurs.

It should be noted that computer implementation of this aspect of the invention is critical because time is of the essence. These red-light warning processes cannot be carried out mentally, or with paper and pencil, because the various steps must be completed, and determinations made, with a period on the order of approximately one second. Even a few seconds of delay will substantially degrade the utility of these processes, i.e. the value of the red light warning messages. In a preferred embodiment, new input data (output data from the prediction process) is received once per second. Calculations should be completed before the new updated data arrives. In short, the process should be carried out substantially in real-time, excepting communication latencies.

Various application services may use or "consume" red light warning messages. The application services, typically implemented in software or firmware, may be on board a vehicle and configured for warning a driver-user of the vehicle. In some embodiments, on board systems may comprise or be coupled to on-board autonomous or semi-autonomous vehicle control systems. Such systems may take the warning message into account in their operations. Some examples of such on-board systems are described below with regard to FIG. 13. Some application services may be in fixed locations, in or adjacent to the traffic signal. Application services may broadcast warning messages, using lights, sound, and electronic messaging, or any combination of these or other methods to warn other drivers, cyclists, pedestrians and other users of the subject location.

Importantly, this feature does not rely on the traffic signal controller (FSC) to tell the signal state, nor does it rely solely on a known state (e.g., currently yellow). Instead, it is a generalized method that is all inclusive of any deterministic event from the traffic controller, and determines all potential red light phase change events ahead of time. This prediction based approach will provide additional safety benefits over current technologies. As just one example, on a slippery road, several seconds of prior warning can make the difference in avoiding a possible collision likely to occur if it was not in place. However, as explained above, predictions do not always turn out to be true. Therefore, additional logic is needed.

Figure 10:
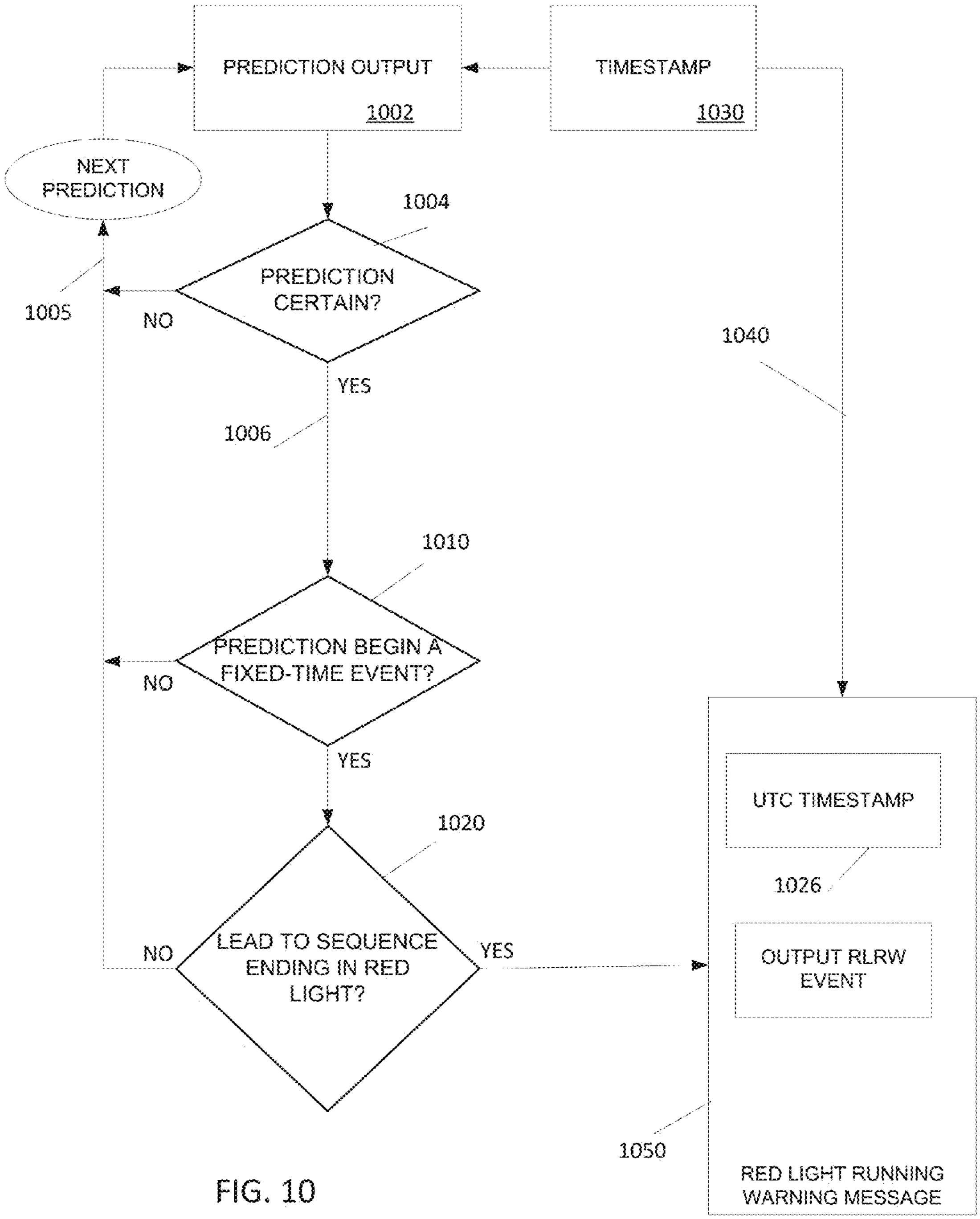
FIG. 10 is a simplified flow diagram illustrating a process for generating a red light warning message based on predictive traffic signal state data.

Referring now to FIG. 10 as one example, the "PREDICTION output" 1002 may be a software component that comprises, or that receives output data from, a prediction system or service that predicts operations of a given traffic signal. In some cases, the prediction system or service may implement an emulator of the corresponding field traffic signal controller (FTSC), also called a field signal controller (FSC), such as those discussed above. That is, the emulator emulates or mimics, for example by executing suitable stored software in a digital processor, the operation of an FSC. In other cases, a prediction system or service may use statistical methods rather than emulation to predict signal operation.

The prediction component for a given traffic signal generates predicted traffic signal state data; this data may include, for example, second by second signal status predictions for the next two main switches: red to green, and green to (yellow then to) red. In other words, the prediction component may generate updated data periodically, for example, once per second, although this interval is not critical. It should be no longer than a few seconds. The prediction component may be implemented in a server, for example, in the cloud, or on-board a vehicle, or in a hybrid combination of on-board and remote resources. A hybrid prediction system is described in our application Ser. No. 15/179,850 filed Jun. 10, 2016 and incorporated herein by this reference.

Again referring to FIG. 10, at decision 1004, the process determines whether the prediction is certain; that is, is the predicted state change certain to occur. It may not be. For example, a predicted change from green to yellow, based on a default green time period, could be delayed by an extension of the green time, responsive to traffic conditions. Other predictions are more certain. So this step filters out predicted state changes that are not certain. This information may take the form of "derived rules" further discussed with regard to FIG. 12. That is, these rules are derived from the signal timing plan of the traffic signal of interest. If the prediction is not certain, the process loops via 1005 to await the next updated prediction.

Continuing via path 1006, the process next determines whether the (certain) predicted state change will begin a fixed-time traffic control event, decision 1010. In more detail, the predictions from emulator output 1002 may not always be 100% accurate; many modern controllers can change signal timing based on traffic detection inputs (vehicle/bike detection, public transit check-in, and pedestrian push buttons are common examples). The emulation is based on the input of predicted traffic demand; for example, see FIG. 7 and associated text. However, predicting the signal phase calls (based on traffic detection inputs) inherently has errors as traffic demand is highly volatile and varying during any time of the day. Therefore, the emulation output also has uncertainties, and usually the data is assigned a confidence level to indicate the prediction accuracy.

Fixed-time events can be scheduled or fixed in the sequence of signal control logic. In general, they can be discerned from the traffic signal timing plan. Analysis of the signal timing plan is discussed further with regard to FIG. 12. One example is the generally fixed yellow times; although they can vary among different phases even for the same intersection, the yellow time durations are usually fixed for the same phase. The same applies to a so-called “all-red” phase during which signal heads of all phases remain red for short period to allow traffic to clear the intersections.

There are other signal control events that also have a fixed timer associated, for example, the typical fixed-time control, where the phase sequence and splits (green plus yellow plus all-red times) remain the same. These fixed events may include various signal switch times such as red to green as well. At the next decision step, block 1010, each of these fixed events is considered. Again, these fixed-time events may be extracted from the signal timing plan for the FSC of interest. Note that in a presently preferred embodiment, this selection process 1004-1010-1020 is completed at each prediction for each output; only a subset of the predicted signal state changes will make its way here.

At decision 1020, another filtering step, the illustrated process compares the current prediction (and current state) to those signal sequences in the timing plan that necessarily lead to a state change to a red light. For example, some events may be fixed and known, but not necessarily lead the switch from yellow to red. The most obvious is the prediction of red to green switch times; while the vehicle controlled by the concerned phase is approaching the intersection while the light is still red. When it reaches the stop line, the light could be green by prediction. Then this is not considered a red light violation (or potential violation) for at least this phase, as the vehicle is not about to enter the intersection (or cross the limit line) while the signal is red. However, this may be a true red light running possible occurrence for phases on conflicting approaches or movements; those will be recorded as the red light running warning event (RLRW). Above, for simplicity, we referred in some cases to green to red as one switch or state change; however, in practice usually controllers for urban intersections have the normal sequence of green-yellow-red. This sequence can vary, however; some countries may have additional intervals. For example, Canada has a flashing green interval and Germany has a combined red and yellow interval. All such variations can be accommodated in view of the present disclosure. Continuing with the illustrated embodiments, after the filtering step 1020, the filtered (fixed) events have been identified for vehicles controlled by at least one phase; some could have impact on vehicles controlled by multiple phases.

Figure 11:
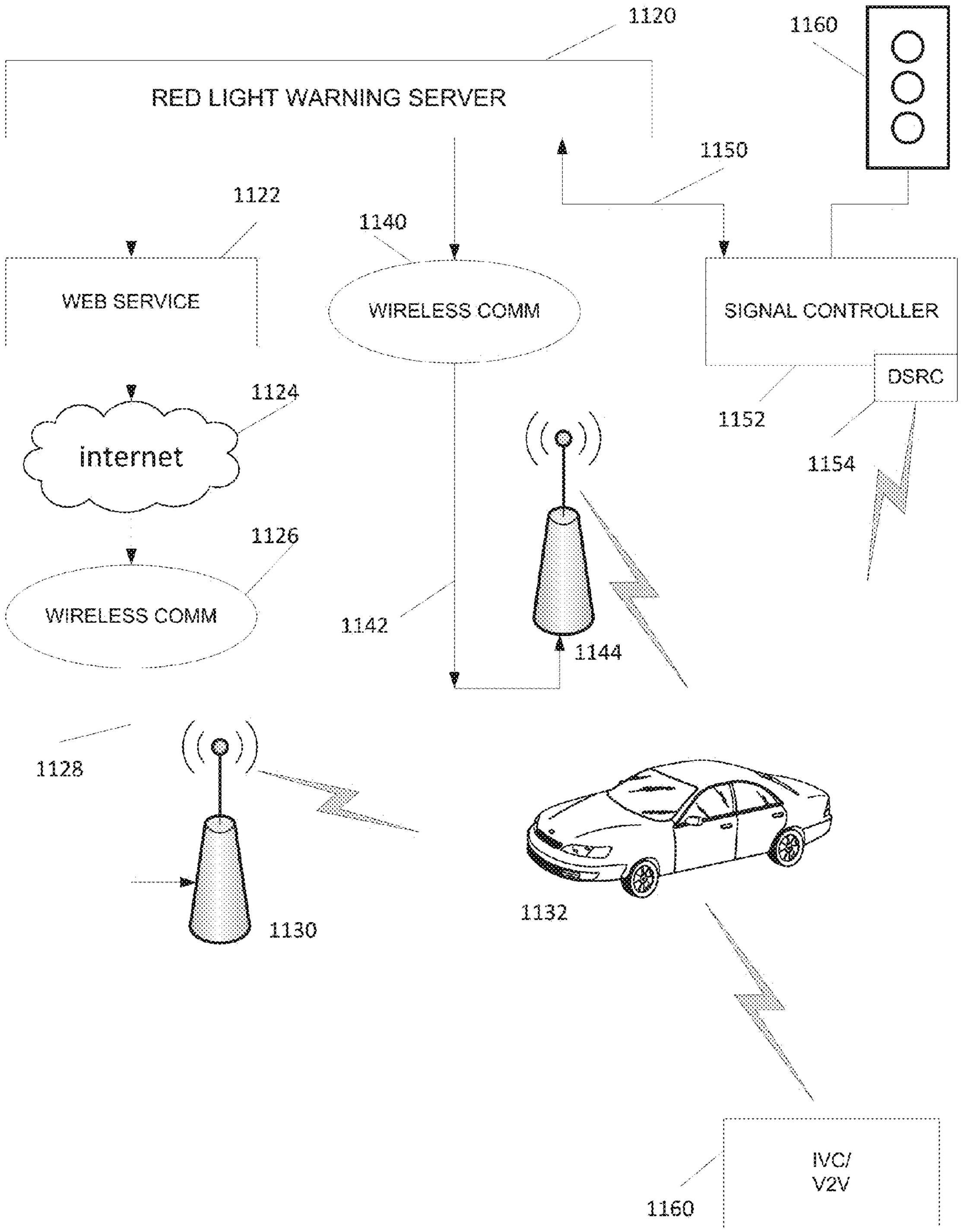
FIG. 11 is a simplified communication diagram illustrating some examples for distributing a red light warning message to one or more vehicles or other users.

A timestamp is received from a source 1030, for example, a UTC timestamp. The latest timestamp is added to the incoming prediction data when it is received at block 1002. In the event that a warning message is generated, the same timestamp 1026 is added to the warning message 1050. That is, the same timestamp value as that associated to the prediction instance that led to the warning message is added to the warning message. In this way, downstream consumers of the message will know the time of the prediction. By comparing to a current time downstream, an adjustment may be made to correct for latency in delivery of the message. In an embodiment, a system may have an embedded time synchronization module that gets the Universal Coordinated Time (UTC) time. This can be polled from multiple Network Time Protocol (NTP) servers and the best estimate, or it can use a time server itself to get the time reference. Getting the timestamp is a critical component in some embodiments, as the prediction does not depend on field communications such as the dedicated short range communication (DSRC) as described in (http://www.iteris.com/cvria/html/applications/app57.html). In the case of DSRC, when such messages are broadcast, it is broadcast with no timestamps as it is required to have the latency of under 0.1 seconds. FIG. 11 is a simplified communication diagram illustrating some examples for distributing a red light warning message to one or more vehicles or other users. Referring to FIG. 11, some examples are illustrated for distributing a RLRW message. For example, the message can be generated by a red light warning server 1120 and packaged as a web service 1122 to be polled by in-vehicle computers that have wireless internet access. To illustrate, the figure shows the web service 1122 coupled to an internet cloud 1124 for communication with a wireless communication network 1126, which in turn may communicate via connection 1128 to a wireless communication antenna 1130. The antenna 1130 may be used to enable communication with a vehicle 1132. Alternatively, the message generated by the red light warning server 1120 may be provided to a wireless communication network 1140 and thence via connection 1142 to a wireless communication antenna 1144 for communication with the vehicle 1132. Alternatively, the message generated by the red light warning server 1120 may be communicated via path 1150 to a signal controller 1152 which, in turn, may utilize DSRC 1154 to communicate the message to vehicle 1132.

Figure 12:
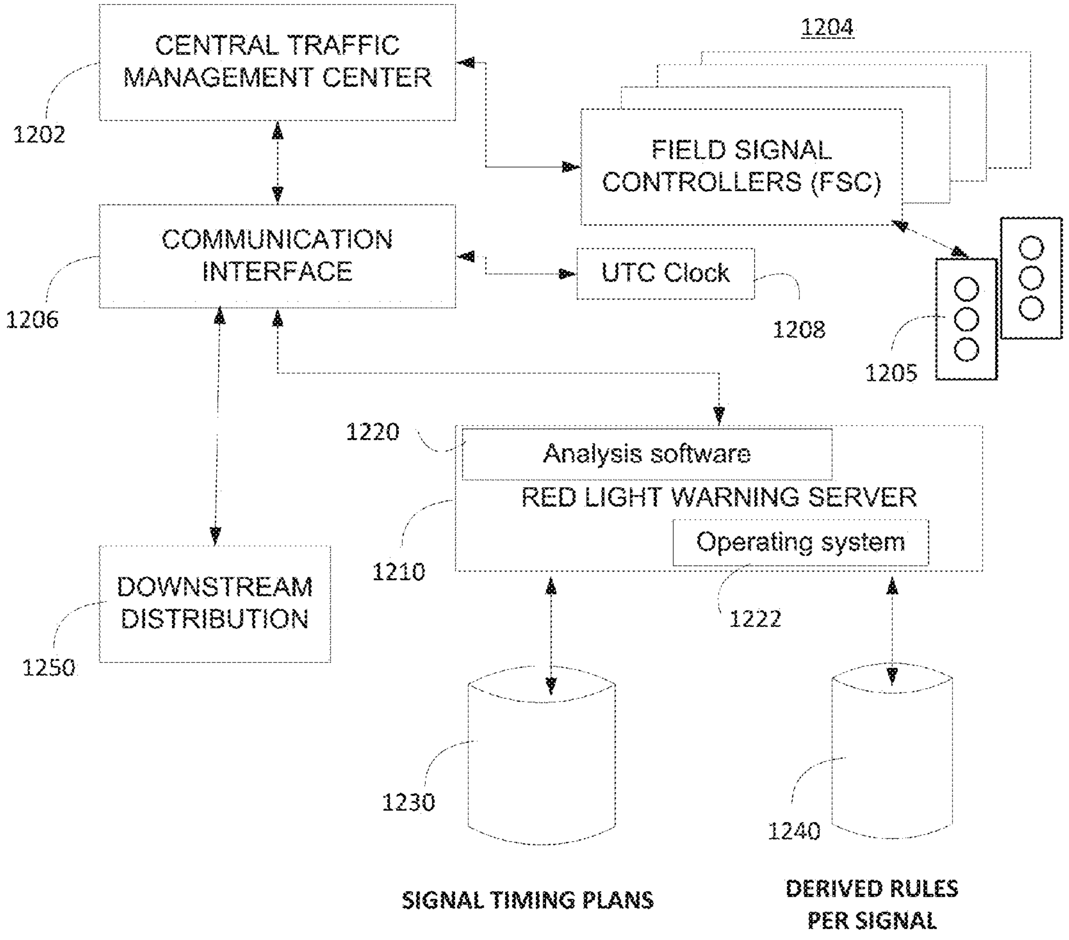
FIG. 12 is a simplified block diagram of a system that realizes features of the present disclosure.

FIG. 12 is a simplified block diagram of an example of a system consistent with the present disclosure for generating a red light warning message. A red light warning server (RLWS) 1210 does most of the work. The RLWS 1210 includes an operating system 1222 software that controls a processor (not shown) and may access other hardware and software resources. One such resource may be a communication interface 1206 arranged to enable the RLWS to communicate with other entities, local or remote, using various known methods and protocols. The communication interface 1206 may be configured for communication with a central traffic management center 1202. See 510 in FIG. 5. In some cases, the central management center may oversee traffic operations for an entire city or part of a city. The central management system 1202 is coupled to a plurality of individual field signal controllers (FSC) indicated generally at 1204. Each FSC controls a corresponding location such as found at street intersections, freeway ramps, and the like, for directing traffic, which may include without limitation pedestrians, bicycles, cars, buses, mass transit vehicles, etc.

Typically, the FSC controls a plurality of individual signal "heads" indicated at 1205. The communication interface 1206 also may be used to access a timestamp source such as a UTC clock site 1208.

The red light warning server (RLWS) 1210 also includes analysis software 1220 which is executable on the processor, again under control of the OS 1222. Operation of the analysis software 1220 was described above with regard to the flow diagram of FIG. 10. Here, the diagram of FIG. 12 illustrates connection of the RLWS 1210 via the communication interface 1206 to the central management center 1202. Using this link, or other means, the RLWS is able to download a traffic signal timing plan for a given traffic signal. That is, the timing plan executed by the FSC 1204 at the corresponding field location. In some embodiments, the RLWS may store the signal timing plan in a datastore 1230. The signal timing plan may be downloaded and analyzed in advance of processing actual (real time) prediction input data. The signal timing plan is analyzed by the software 1220 to identify or derive certain rules based on the signal timing plan. The resulting derived rules may be stored in a datastore 1240, which may be the same as the datastore 1230 but in a different file or table. The derived rules may be utilized by the RLWS as described earlier to generate a red light warning message responsive to input data. The input data in this regard, such as signal states, state changes, detector calls, etc. may be provided to the RLWS by the Central Traffic Management Center 1202, which acquires them from the FSC as noted above. Finally, a red light warning message generated by the server 1210 may be distributed via the communication interface 1206 or via other downstream distribution means 1250 such as described above with regard to FIG. 11.

Figure 13:
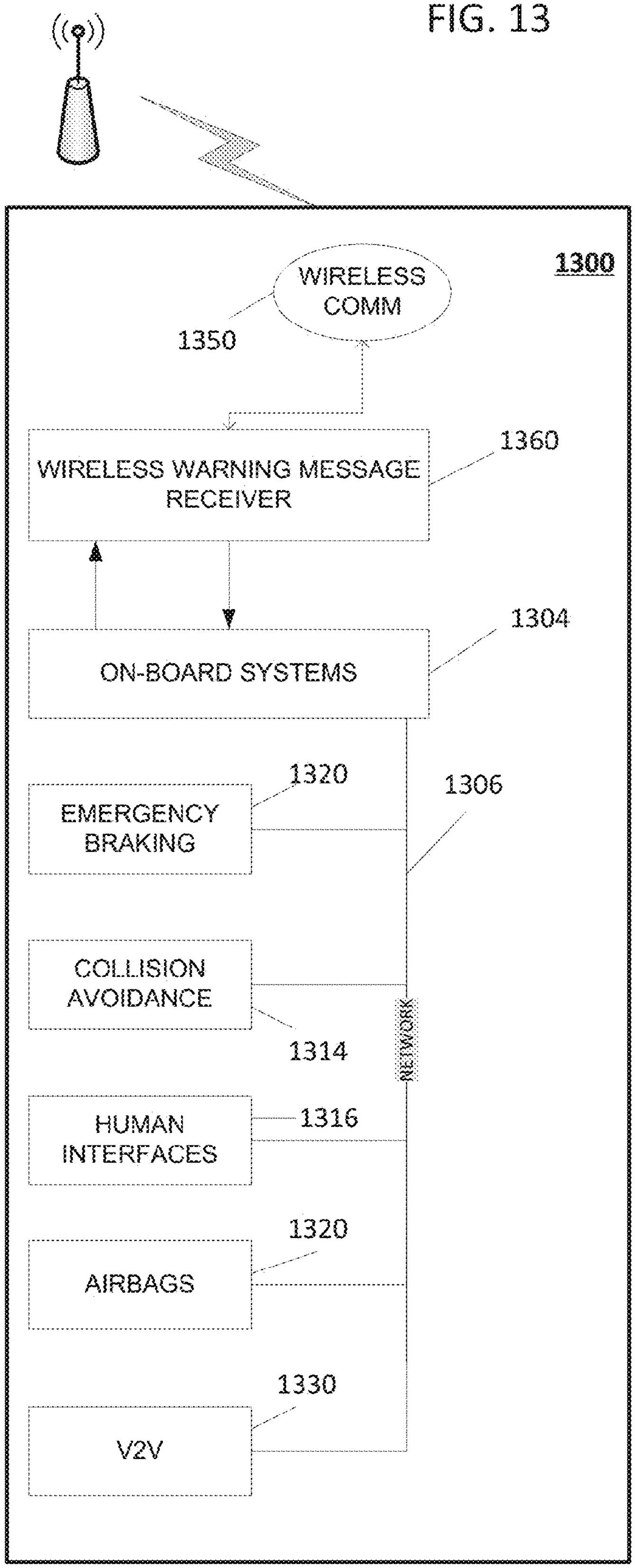
FIG. 13 is simplified block diagram of some examples of vehicle on-board systems that may receive inputs or take actions responsive to receiving a red light warning message.

FIG. 13 is a simplified block diagram illustrating some examples of on-board systems that may be found in a vehicle 1300. Various vehicles may have various subsets of these examples, and some vehicles may have other systems not shown that utilize or "consume" red light warning messages, all considered within the scope of this disclosure. In a vehicle 1300 a wireless communication module 1350 may be deployed, details of which are known. For example, in some embodiments, a wireless telecommunication link may be used. A data channel or service of a telecom link may be used. In other cases, data communications may utilize a voice channel or "in-band" signaling (again over telecom) to receive small amounts of data, such as a red light warning message. Whatever the communications means may be, the message is delivered to a wireless warning message receiver, block 1360, which may be implemented in hardware, software, or a combination of the two. The receiver 1360 in turn may be coupled to various on-board systems or components, generally indicated at 1304. Such on-board systems may be coupled to a local network 1306, for example, a CAN network, Ethernet, etc.

Some of the on-board systems may include emergency braking 1320; collision avoidance 1314; human interfaces 1316 (for example, dashboard displays, audio announcements, "head unit" or navigation screen, etc.); airbags 1320. Airbag logic may take a red light warning into account, along with other input variables. Finally, other components may include vehicle-to-vehicle ("V2V") communications. For example, warnings may relayed to other vehicles that may be closely following the vehicle 1300. In another example, warning messages may be sent to crossing vehicles—for example, a first vehicle entering an intersection crossing the path of a second vehicle that is subject to an upcoming red light state change.

One of skill in the art will recognize that the concepts taught herein can be tailored to a particular application in many other ways. In particular, those skilled in the art will recognize that the illustrated examples are but one of many alternative implementations that will become apparent upon reading this disclosure. It will be obvious to those having skill in the art that many changes may be made to the details of the above-described embodiments without departing from the underlying principles of the invention.

The scope of the present invention should, therefore, be determined only by the following claims.

The invention claimed is:

1. A system for generating a warning message before a traffic control signal changes to a red light state, comprising:

a red light warning server system including an operating system program and a processor operable under control of the operating system, and further including an analysis program stored in the server system and executable by the processor;

a communications interface coupled to the red light warning server system and configured for communications with a central traffic management center to download a signal timing plan for a selected traffic signal to the red light warning server system, the selected traffic signal associated with a corresponding intersection, and to download current signal state data from the selected traffic signal to the red light warning server system, wherein the current signal state data includes a current signal state for each phase of the selected traffic signal;

the communications interface further arranged to receive prediction data associated with the selected traffic signal, the prediction data generated by emulating operation of a field signal controller (FSC) that controls the selected traffic signal or by statistical methods based on storing historic data for the selected traffic signal;

the communications interface further coupled to the red light warning server system to enable transmitting a red light warning message to a downstream system;

the analysis program comprising software code configured to analyze the downloaded signal timing plan, wherein the analysis includes, based on the signal timing plan, forming derived rules that include (a) identification of predicted state changes that are certain to occur; (b) identification of state changes that begin a fixed-time interval signal control event; and (c) identification of state changes; and a warning message software component stored in machine-readable memory accessible to the red light warning server system for execution by the processor to process the received prediction data based on the derived rules and the current signal state data, the warning message software component configured to:

determine an expected state change of the selected traffic signal to a red signal state that is certain to occur; based on the expected state change of the selected traffic signal to the red signal state that is certain to occur, to generate the red light warning message; and associate the generated red light warning message to the selected traffic signal;

apply a timestamp to the generated red light warning message, the timestamp based on receiving the current signal state data;

transmitting the time-stamped, generated red light warning message to a downstream application for use in a vehicle;

wherein the downstream application is configurable, in a case of a non-autonomous vehicle, to cause display of a message in the vehicle based on the time-stamped, generated red light running warning message; and in a case of an autonomous or semi-autonomous vehicle, to provide the warning message to operational logic to affect controlling the vehicle ahead of the corresponding intersection.

2. The system according to claim 1 and further comprising:

a first datastore operatively coupled to the red light warning server system to store the signal timing plan; and a second datastore operatively coupled to the red light warning server system to store the derived rules.

3. The system according to claim 1 and wherein the communications interface is configured to download the current signal state data for all phases of the selected traffic signal and then periodically download an updated set of the current signal state data from the central traffic management center.

4. A computer-implemented method comprising the steps of:

providing a red light warning server system having a processor and machine-readable memory coupled to the processor, the machine-readable memory storing instructions that, when executed by the processor, cause the processor to carry out the following steps:

receiving a set of predicted traffic signal state data for a selected traffic signal from a traffic signal prediction process, the selected traffic signal located at an intersection, and the traffic signal prediction process comprising emulating a field signal controller (FSC) associated with the selected traffic signal and or a statistical process based on historical state data of the selected traffic signal;

wherein the predicted traffic signal state data indicates, for each phase of the selected traffic signal, a current signal state, and an expected signal state change to a next signal state; and wherein the predicted traffic signal state data further includes, for each phase of the selected traffic signal, a predicted time interval remaining until the expected signal state change;

applying a timestamp to the predicted traffic signal state data received from the prediction process;

accessing a signal timing plan of the selected traffic signal stored in a first database;

deriving a set of rules from the signal timing plan and storing the derived rules in a derived rules per signal database, the derived rules including (a) identification of predicted state changes that are certain to occur; (b) identification of state changes that begin a fixed-time interval signal control event; and (c) identification of state changes;

based on the derived rules selecting from the predicted traffic signal state data an expected state change that is certain to occur;

based on the derived rules, determining whether the selected expected state change that is certain to occur is one that will trigger a start of a fixed-time signal control event;

based on a determination that the selected expected state change will trigger the start of a fixed-time signal control event, determining, based on the derived rules, whether at a conclusion of the fixed-time signal control event, the selected traffic signal will change state to a red signal state;

based on a determination that the fixed-time signal control event will conclude with the selected traffic signal changing state to the red signal state:

generating a red light warning message associated with the selected traffic control signal;

applying the timestamp to the red light warning message; and transmitting the time-stamped red light warning message to a downstream application;

in a case of a non-autonomous vehicle, displaying a message in the vehicle based on the time-stamped red light running warning message; and in a case of an autonomous or semi-autonomous vehicle, providing the time-stamped warning message into operational logic for controlling the vehicle ahead of the intersection.

5. The method of claim 4 wherein transmitting the time-stamped, red light running warning message includes transmitting the time-stamped, red light running message to a server for communication to at least one vehicle in a vicinity of the traffic control signal.

6. The method of claim 4 including periodically updating the predicted traffic signal state data from the prediction process; and after each update of the predicted traffic signal state data repeating the steps of:

selecting from the received output data an expected state change that is certain to occur, determining whether the selected expected state change that is certain to occur is one that will trigger a start of a fixed-time signal control event, and determining whether at a conclusion of the fixed-time signal control event, the selected traffic signal will change state to a red signal state.

7. The method of claim 6 wherein the predicted traffic signal state data from the prediction process is updated approximately once per second.

8. The method of claim 4 including providing in the time stamped red light warning message an estimated time interval remaining until the selected traffic signal state is expected to change state to the red state.

9. The method of claim 4 wherein the fixed-time signal control events comprise a fixed yellow time for a given phase of the FSC.

10. The method of claim 4 wherein the fixed-time signal control events include an "all-red" period during which the signal heads of all phases of the selected traffic control signal remain red for a predetermined period to allow traffic to clear the intersection.

11. The method of claim 4 wherein the fixed-time signal control events include a fixed timer wherein the phase sequence and splits, comprising green signal state duration, plus yellow signal state duration, plus all-red signal state duration, remain the same.

12. The method of claim 4 wherein the fixed-time signal control events include a predetermined signal switch time.

13. The method of claim 4 wherein transmitting the time-stamped red light warning message utilizes a web service that enables wireless communication with in-vehicle computers that have wireless internet access.

14. The method of claim 4 wherein the time-stamped red light warning message is packaged as a separate add-on to a dedicated short range communication (DSRC) broadcast radio in a roadside unit (RSU).

* * * * *